(12) United States Patent
Guz et al.

(10) Patent No.: US 9,836,277 B2
(45) Date of Patent: Dec. 5, 2017

(54) IN-MEMORY POPCOUNT SUPPORT FOR REAL TIME ANALYTICS

(71) Applicants: Zvika Guz, Palo Alto, CA (US); Liang Yin, San Jose, CA (US)

(72) Inventors: Zvika Guz, Palo Alto, CA (US); Liang Yin, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 344 days.

(21) Appl. No.: 14/687,676

(22) Filed: Apr. 15, 2015

(65) Prior Publication Data

US 2016/0098200 A1     Apr. 7, 2016

Related U.S. Application Data

(60) Provisional application No. 62/058,568, filed on Oct. 1, 2014.

(51) Int. Cl.
| | |
|---|---|
| *G06F 3/06* | (2006.01) |
| *G06F 7/00* | (2006.01) |
| *G06F 11/30* | (2006.01) |
| *G06F 15/76* | (2006.01) |
| *G06F 9/30* | (2006.01) |
| *G06F 9/38* | (2006.01) |
| *G06F 15/78* | (2006.01) |

(52) U.S. Cl.
CPC .............. *G06F 7/00* (2013.01); *G06F 9/3001* (2013.01); *G06F 9/3004* (2013.01); *G06F 9/30018* (2013.01); *G06F 9/3877* (2013.01); *G06F 11/30* (2013.01); *G06F 15/76* (2013.01); *G06F 15/7821* (2013.01); *Y02B 60/1207* (2013.01); *Y02B 60/1225* (2013.01)

(58) Field of Classification Search
CPC ...... G06F 9/3004; G06F 7/00; G06F 9/30018; G06F 9/3001; G06F 9/3877; G06F 11/30; G06F 15/76; G06F 15/7821
USPC ........................................................ 711/154
See application file for complete search history.

(56) References Cited

U.S. PATENT DOCUMENTS

| | | | |
|---|---|---|---|
| 7,958,173 | B2 | 6/2011 | Moyer et al. |
| 8,387,065 | B2 | 2/2013 | Arimilli et al. |

(Continued)

*Primary Examiner* — Jasmine Song
(74) *Attorney, Agent, or Firm* — Renaissance IP Law Group LLP

(57) ABSTRACT

A Processing-In-Memory (PIM) model in which computations related to the POPCOUNT and logical bitwise operations are implemented within a memory module and not within a host Central Processing Unit (CPU). The in-memory executions thus eliminate the need to shift data from large bit vectors throughout the entire system. By off-loading the processing of these operations to the memory, the redundant data transfers over the memory-CPU interface are greatly reduced, thereby improving system performance and energy efficiency. A controller and a dedicated register in the logic die of the memory module operate to interface with the host and provide in-memory executions of popcounting and logical bitwise operations requested by the host. The PIM model of the present disclosure thus frees up the CPU for other tasks because many real-time analytics tasks can now be executed within a PIM-enabled memory itself. The memory module may be a Three Dimensional Stack (3DS) memory or any other semiconductor memory.

24 Claims, 7 Drawing Sheets

(56) References Cited

U.S. PATENT DOCUMENTS

| | | |
|---|---|---|
| 8,661,072 B2 | 2/2014 | Blaner et al. |
| 9,325,494 B2 * | 4/2016 | Boehl ................ H04L 9/003 |
| 9,449,675 B2 * | 9/2016 | Wheeler ............. G11C 7/1006 |
| 2014/0006745 A1 | 1/2014 | Fontenot et al. |

* cited by examiner

```
01: unsigned char countBits(unsigned char x)
02: {
03:    // count bits of each 2-bit chunk
04:    x  = x - ((x >> 1) & 0x55555555);
05:    // count bits of each 4-bit chunk
06:    x  = (x & 0x33333333) + ((x >> 2) & 0x33333333);
07:    // count bits of each 8-bit chunk
08:    x  = x + (x >> 4);
09:    // mask out junk
10:    x &= 0x0F;
```

IN-MEMORY POPCOUNT SUPPORT FOR REAL TIME ANALYTICS

CROSS-REFERENCE TO RELATED APPLICATION

This application claims the priority benefit under 35 U.S.C. §119(e) of U.S. Provisional Application No. 62/058,568 filed on Oct. 1, 2014, the disclosure of which is incorporated herein by reference in its entirety.

TECHNICAL FIELD

The present disclosure generally relates to memories. More specifically, and not by way of limitation, particular embodiments of the inventive aspects disclosed in the present disclosure are directed to processing of a POPCOUNT operation and logical bitwise operations within a memory module itself.

BACKGROUND

Latency-sensitive processing and real-time analytics are expected to account for significant fraction of processing cycles in hyperscale data centers, which may include cloud-based computing centers. Real-time analytics is a growing market, which is estimated to reach over $13 billion by 2018. Bitmap operations are important building blocks in many real-time analytics operations. Bitmaps store bit-arrays of users, events, webpages, and so on. Furthermore, bitmaps facilitate many efficient queries such as, for example, tracking of events, or tracking of number of unique visitors, data mining, and so on. Common real-time analytics operations on bitmaps include POPCOUNT operations (discussed below) and logical bitwise operations such as OR, AND, XOR, NAND, and the like.

A common use-case in real-time analytics is maintenance of various statistics of website usage via large bitmaps. A POPCOUNT (or population count) operation counts the number of ones (1s) in a bit sequence. Its usage has traditionally been in cryptography, but has been gaining popularity in recent years in the real-time data analytics domain. For example, a website can track webpage visit per user through a bit vector—with each "1" bit corresponding to one user. Thus, counting the number of unique visitors for a given webpage is essentially popcounting the bit vector. As an illustration, in case of a website with 4 million users, the bit vector size needed to account for all the users is on the order of 512 kilo bytes (KB) (=4 Mb (mega bits)).

It is noted here that the capitalized term "POPCOUNT," its non-capitalized version "popcount," and the term "bit-count" may be used interchangeably herein for ease of discussion. Similarly, for ease of discussion, the terms "bitmap" and "bit vector" may be used interchangeably below as essentially referring to a sequence of bits.

SUMMARY

In one embodiment, the present disclosure is directed to a method that comprises: (i) receiving at a memory module an instruction from a host to perform a POPCOUNT operation on a bit vector stored in the memory module; and (ii) executing the POPCOUNT operation within the memory module, without transferring the bit vector to the host for the execution.

In another embodiment, the present disclosure is directed to a method that comprises: (i) receiving at a memory module an instruction from a host to perform a logical bitwise operation on two or more bit vectors stored in the memory module; and (ii) executing the logical bitwise operation within the memory module, without transferring the bit vectors to the host for the execution.

In a further embodiment, the present disclosure is directed to a memory module, which comprises: a memory chip; and a logic die connected to the memory chip. The memory chip and the logic die may be included within the packaging of the memory module. The logic die is operative to control data transfer between the memory chip and an external host. In the memory module, the logic die includes a controller that is operative to: (i) receive an instruction from the host to perform at least one of the following: (a) a POPCOUNT operation on a first bit vector stored in the memory chip, and (b) a logical bitwise operation on two or more second bit vectors stored in the memory chip; and (ii) perform at least one of the following: (a) execute the POPCOUNT operation, without transferring the first bit vector to the host for the execution of the POPCOUNT operation, and (b) execute the logical bitwise operation, without transferring the second bit vectors to the host for the execution of the logical bitwise operation.

BRIEF DESCRIPTION OF THE DRAWINGS

In the following section, the inventive aspects of the present disclosure will be described with reference to exemplary embodiments illustrated in the figures, in which.

DETAILED DESCRIPTION

Figure 1A:
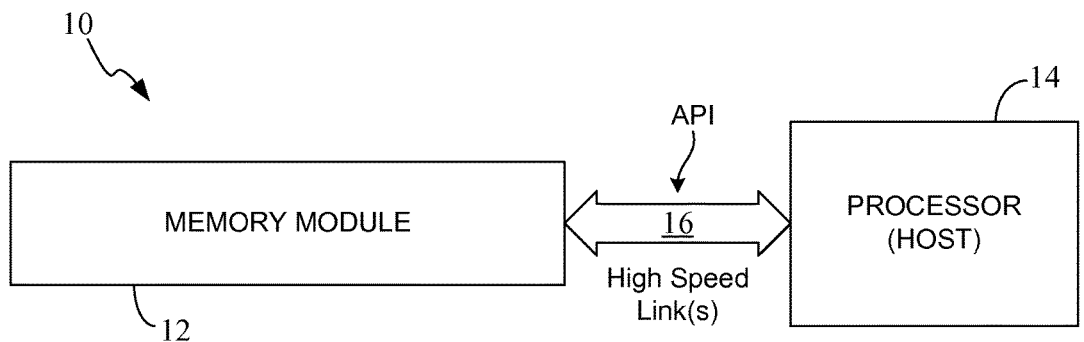
FIG. 1A shows a highly simplified, partial layout of a system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented to perform in-memory operations in any semiconductor-based storage system, including, for example, 3DS as well as non-3DS memories.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "real-time," "pre-defined", "CPU-based," etc.) may be occasionally interchangeably used with its non-hyphenated version (e.g., "real time," "predefined", "CPU based," etc.), and a capitalized entry (e.g., "POPCOUNT," "Logic Die," etc.) may be interchangeably used with its non-capitalized version (e.g., "popcount," "logic die," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such.

Currently, all real-time analytics frameworks rely on a memory for storing the datasets, whereas the POPCOUNT or bitwise logical operations are executed in a Central Processing Unit (CPU). As a result, a large amount of data needs to be transferred out from the memory—where the data or bitmaps are saved—to the CPU for the computation. Hence, the performance of the system executing the popcounting or logical bitwise operations—such as, for example, the earlier-mentioned hyperscale data centers—is constrained by the multiple back-and-forth data transfers between the memory and the CPU.

In case of the previous example of a website with 4 million users, a large amount of data needs to be transferred out from the memory to the CPU for the computation. However, the CPU-generated result of the popcount operation may be only approximately three bytes long because $2^{22}$=512 KB and, hence, the CPU may output $\log_2(2^{22})$=22 binary bits (≈3 bytes) as representing the popcount value for the 512 KB bit vector. This is similar to using three binary bits to count up to eight (8), or using four binary bits to count up to sixteen (16), and the like. Thus, popcounting is essentially a reduction operation over a large bit vector. However, as noted above, the traditional computation model is inefficient because the computation time and energy are dominated by redundant movements of large datasets from memory to the CPU throughout the system, and back. This inefficiency is further exacerbated because, typically, only the final popcount result is ever used by a program, and all intermediate bit vectors or datasets are discarded.

In one embodiment, a memory module may be configured to include a controller that may comprise the hardware and/or software to support the in-memory implementations of popcounting and logical bitwise operations. In one embodiment, the memory module may be a Three Dimensional Stack (3DS) memory module whose base or logic die may be configured to include the controller. For example, in case of the POPCOUNT operation, a Processing-In-Memory (PIM) model according to the teachings of the present disclosure may provide for the following additions to the memory module (or to the base/logic die of a 3DS memory): (i) A hardware-based reduction tree that may calculate the popcount for (up to) a full Dynamic Random Access Memory (DRAM) page at a time. (ii) A hardware logic that may enable traversing vectors of sizes different than one DRAM page. (iii) A special register—referred to herein as "PIMResultRegister"—that may store the final result (i.e., the popcount value) and may be used by the memory's host to retrieve the final popcount value. In particular embodiments, this register also may be used to hold intermediate results when the vector size is larger than a DRAM page. In such a situation, this register may accumulate all intermediate results to eventually store the final result for subsequent retrieval by the host. (iv) An interface—such as, for example, an Application Programming Interface (API)—that the host may use for initiation of popcounting and for reading the results from the PIMResultRegister. In one embodiment, such operation initiation and result retrieval may be done through writes and reads to one or more pre-defined storage locations in the memory module. For example, in one embodiment, the API may expose the PIMResultRegister as one such pre-defined memory location where the final popcount value is stored. Thus, any access to that special memory location is a direct access to the PIMResultRegister.

The hardware/software configuration for the above-described in-memory implementation of popcounting may be suitably shared with the in-memory implementation of logical bitwise operations. Furthermore, the host interface API may be suitably augmented with additional instructions, each corresponding to the specific logic function (OR, AND, NAND, and so on). Thus, in case of a 3DS memory module, the logic die of the 3DS memory module may be configured as per teachings of the present disclosure to enable the memory module to completely process POPCOUNT and logical bitwise operations within the memory module itself.

In the Processing-In-Memory (PIM) model, computations related to the popcount and other logical bitwise operations are implemented/executed within a memory module, without shifting the data throughout the entire system. In particular embodiments, the memory module may be a Dynamic Random Access Memory (DRAM) based Three Dimensional Stack (3DS) memory module such as, for example, a High Bandwidth Memory (HBM) module, or a Hybrid Memory Cube (HMC) memory module. In particular embodiments, the teachings of the present disclosure may also apply to Solid State Drives (SSDs), non-3DS DRAM modules, and any other semiconductor-based storage systems such as, for example, Static Random Access Memory (SRAM), Phase-Change Random Access Memory (PRAM or PCRAM), Resistive Random Access Memory (RRAM or ReRAM), Conductive-Bridging RAM (CBRAM), Magnetic RAM (MRAM), Spin-Transfer Torque MRAM (STT-MRAM), and the like. By off-loading the processing of the popcount and logical bitwise operations to the memory, the redundant data transfers over the memory-CPU interface (and also over other system interfaces) are greatly reduced, thereby improving system performance and energy efficiency. The PIM model as per teachings of particular embodiments of the present disclosure thus frees up the CPU for other tasks, reduces cache pollution throughout the memory system, and saves memory bandwidth by greatly reducing transactions over the memory-CPU interface.

Thus, particular embodiments of the present disclosure provide for implementation of POPCOUNT and logical bitwise operations within a memory module itself, thus eliminating the need to shift large bit vectors from the memory to the CPU. Moreover, the memory module may execute the bitcount reduction tree on larger vectors in parallel, thus further improving performance as compared to the traditional CPU implementation. Using the PIM approach as per teachings of the present disclosure, multiple real-time analytics tasks can be executed within a PIM-enabled memory itself, thereby improving overall system performance and saving system power/energy consumption.

FIG. 1A shows a highly simplified, partial layout of a system 10 according to one embodiment of the present disclosure. As shown, the system 10 may include a memory module 12 connected to and in communication with a processor or host 14 via one or more high speed links 16. In the discussion herein, the reference numeral "12" also refers to a packaging or housing of the memory module. The packaging 12 may include one or more memory chips (not shown), such as, for example, DRAM (or other semiconductor-based memory) chips. In the present disclosure, details such as the number of dies/chips per memory module, the number of memory banks per chip and the internal configuration of memory banks in a chip, or the storage capacity of each chip are not relevant, and hence, such details are not provided herein.

Figure 9:
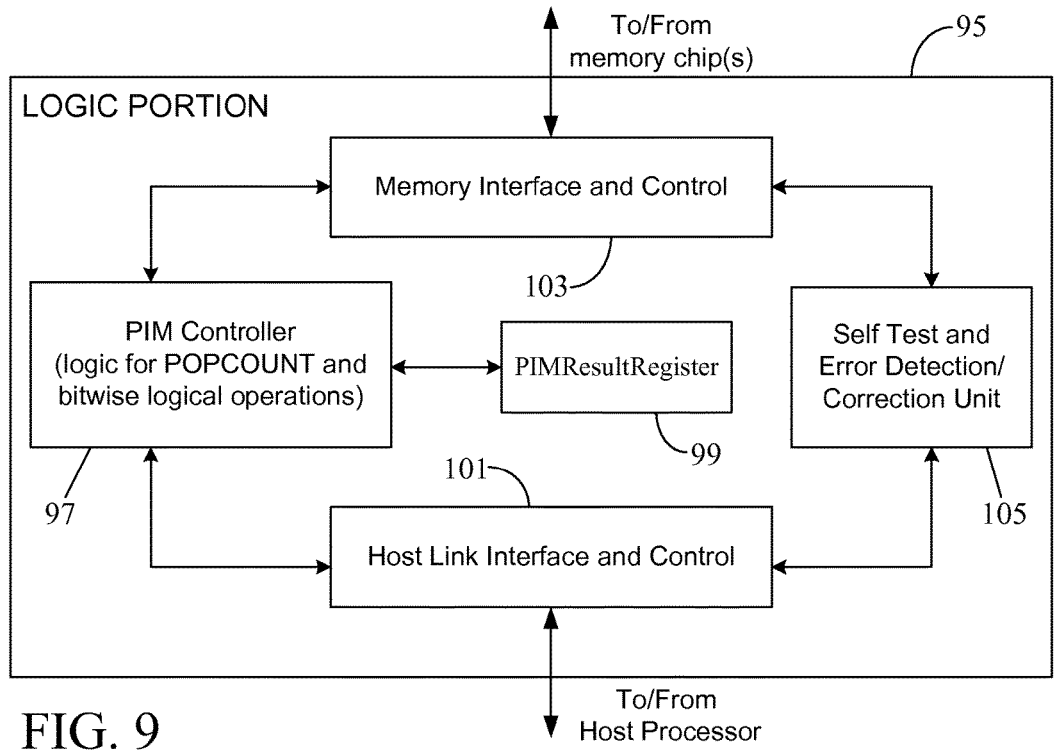
FIG. 9 illustrates an exemplary layout of a logic portion of the memory module in FIG. 1A according to one embodiment of the present disclosure.

In particular embodiments of the present disclosure, a PIM Controller, such as the PIM Controller 97 in FIG. 9, may be implemented as part of the memory module 12. The PIM Controller may interact with the host 14 and manage/facilitate in-memory execution of the POPCOUNT operation as well as logical bitwise operations as discussed in more detail below. In particular embodiments, the PIM logic (or PIM Controller) for the POPCOUNT and logical bitwise operations may be implemented within the memory module 12 regardless of whether a "traditional" memory controller is integrated as part of the logic die of the memory module.

In one embodiment, the host 14 may be a CPU, which can be a general purpose microprocessor. In the discussion herein, the terms "processor" and "CPU" may be used interchangeably for ease of discussion. However, it is understood that, instead of or in addition to the CPU, the processor 14 may contain any other type of processors such as, for example, a microcontroller, a Digital Signal Processor (DSP), a Graphics Processing Unit (GPU), a dedicated Application Specific Integrated Circuit (ASIC) processor, and the like. Furthermore, in one embodiment, the processor/host 14 may include more than one CPU, which may be operative in a distributed processing environment. The processor 14 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the external host may be a System on Chip (SoC) having functionalities in addition to a processor or CPU functionality.

The high-speed link 16 between the memory module 12 and the external host 14 may provide a wide, high-speed local bus for data movement between the memory module 12 and the host 14. As discussed in more detail later below, in one embodiment, the interaction between the logic die-based PIM Controller and the host 14 may be facilitated via an Application Programming Interface (API) provided to the host 14, for example, by the memory module 12 when the memory module 12 is initially installed in the system 10. As symbolically illustrated in FIG. 1A, the API may be provided to the host processor 14 via the connecting link 16. As noted before and as discussed in more detail later below, the host 14 may use the API for initiation of popcounting and for reading the results of popcounting. Furthermore, the host interface API may be suitably augmented with additional instructions, each corresponding to the specific logic function (e.g., OR, AND, NAND, etc.), so as to allow the memory module 12 to perform logical bitwise operations within the memory module itself.

It is noted here that only a single memory module 12 is shown as part of the system 10 in FIG. 1A for ease of illustration only. In a practical implementation, the system 10 may include more than one memory module—all may be of the same type or may be of different types. In one embodiment, the system 10 may include 3DS as well as non-3DS memory modules under operative control of the processor 14. Generally, the memory module 12 may be any semiconductor-based memory or storage system, some examples of which are mentioned earlier (but not repeated herein for the sake of brevity). Furthermore, it is understood that the units shown as part of the system 10 in FIG. 1A or in FIG. 10 may themselves contain may other complex components. However, such components are not illustrated in FIG. 1A or FIG. 10 because of their lack of relevance to the present disclosure.

Figure 1B:
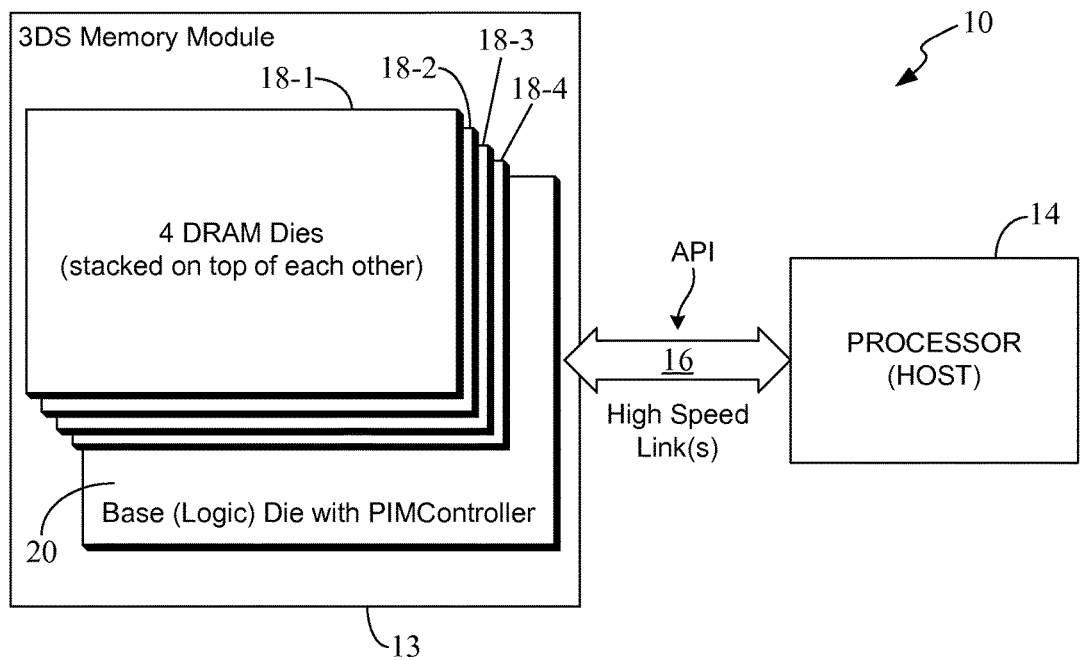
FIG. 1B shows another embodiment of the system in FIG. 1A using a 3DS memory module as an example.

FIG. 1B shows another embodiment of the system 10 in FIG. 1A using a 3DS memory module 13 as an example. The reference numeral "13" also refers to the 3D packaging or housing of the memory module. It is understood that a 3DS memory configuration may offer higher bandwidth and cell density than a classic DRAM memory of the same size. Furthermore, a 3DS memory module may consume less power and operate at higher frequency than traditional DRAM memories like Double Data Rate 2, 3, or 4 (DDR2/DDR3/DDR4) memories. In one embodiment, the 3DS memory module 13 may be an HBM module. In another embodiment, the 3DS memory module 13 may be an HMC memory module.

In the exemplary embodiment of FIG. 1B, the 3D packaging 13 is shown to include four (4) DRAM dies/chips 18 stacked on top of each other, with a base/logic die 20 on the bottom of the stacked DRAM chips. Although each DRAM chip is individually identified using reference numerals 18-1 through 18-4, they may be collectively referred by the reference numeral "18." The DRAM chips 18 may be Synchronous DRAM (SDRAM) memories, which may be connected to each other and to the logic base 20 using through-silicon vias (TSVs) and/or microbumps (not shown). In another embodiment, there may be more or less than four DRAM dies in the memory module 13.

In a 3DS memory configuration, the memory controller functionality may be integrated into the memory package as a separate logic die, such as the logic die 20 in FIG. 1B. The logic base 20 may provide the necessary interface between the external host/processor 14 and the DRAM dies 18. Thus, all transfers of data and control information between the memory module 13 and the host 14 may pass through and be controlled by the logic die 20. In particular embodiments of the present disclosure, a PIM Controller, such as the PIM Controller 97 in FIG. 9, may be implemented as part of the base die 20. As mentioned earlier, the PIM logic (or PIM Controller) for the POPCOUNT and logical bitwise operations may be implemented within the memory module 13 regardless of whether a "traditional" memory controller is integrated as part of the logic die 20 of the memory module.

The high-speed link 16 between the logic die 20 and the external host 14 may provide a wide, high-speed local bus for data movement between the 3DS memory module 13 and the host 14. As discussed in more detail later below, in one embodiment, the interaction between the logic die-based PIM Controller and the host 14 may be facilitated via an API provided to the host 14, for example, by the logic base 20 in the 3DS memory module 13 when the memory module 13 is initially installed in the system 10.

It is noted here that only a single memory module 13 is shown as part of the system 10 in FIG. 1B for ease of illustration only. In a practical implementation, the system 10 may include more than one 3DS memory module—all may be of the same type or may be of different types. In one embodiment, the system 10 may include 3DS as well as non-3DS memory modules and semiconductor memories under operative control of the processor 14. Furthermore, it is understood that the units shown as part of the system 10 in FIG. 1B may themselves contain may other complex components. However, such components are not illustrated in FIG. 1B because of their lack of relevance to the present disclosure.

Although the discussion below may frequently refer to the DRAM-based memory configuration in FIG. 1B, such reference is purely exemplary in nature; the configuration in FIG. 1B is used merely to facilitate discussion of the PIM model according to particular embodiments of the present disclosure. It is understood that the teachings of the present disclosure remain applicable to any semiconductor-based memory or storage systems such as, for example, the earlier-mentioned SRAM, PRAM, RRAM, CBRAM, etc. For the sake of brevity, all such semiconductor-based storage systems/memories are not mentioned when explaining the teachings of the present disclosure in the context of the memory modules shown in FIGS. 1A-1B.

In the discussion below, it is assumed that a bit vector or bitmap on which a popcount operation is to be performed is already stored in one or more of the semiconductor memory chips in the memory module 12, such as, for example, the DRAM chips 18 in the memory module 13. Similarly, it is also assumed that two or more bit vectors on which a logical bitwise operation is to be performed are stored in one or more of the DRAM chips 18 as well. The information regarding how these bitmaps are stored in the memory chips or the source of these bit vectors is irrelevant to the present disclosure and, hence, is not elaborated further.

Figure 2:
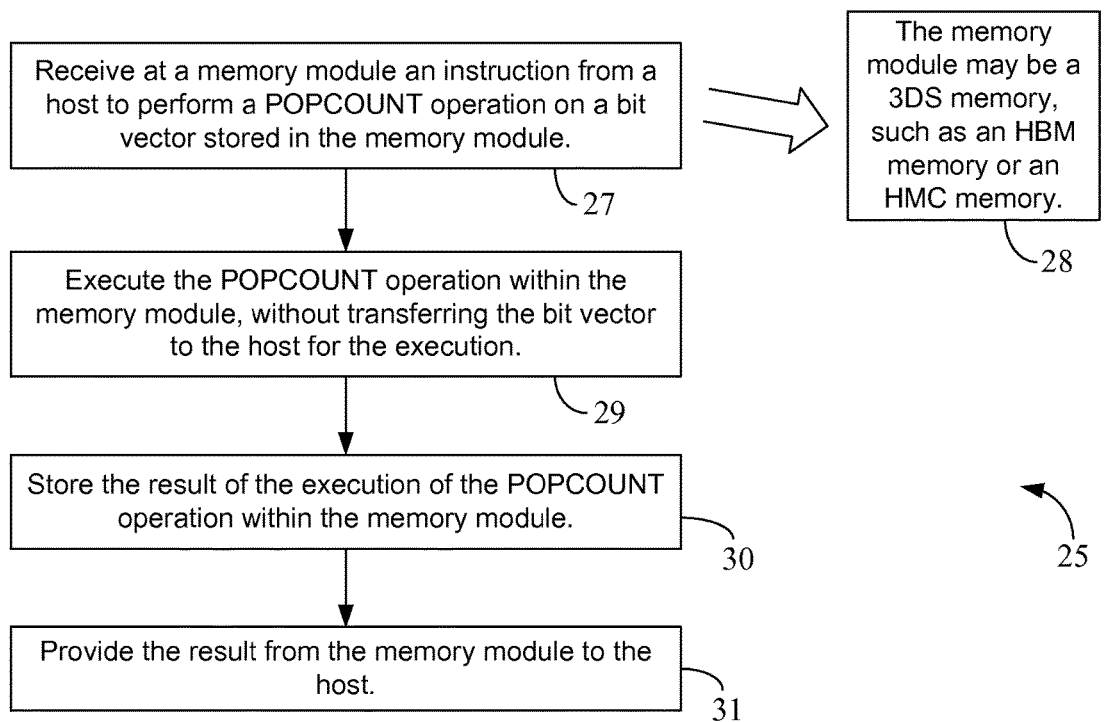
FIG. 2 illustrates an exemplary flowchart showing how a POPCOUNT operation may be executed according to one embodiment of the present disclosure.

FIG. 2 illustrates an exemplary flowchart 25 showing how a POPCOUNT operation may be executed according to one embodiment of the present disclosure. The process illustrated in the flowchart 25 may be performed by the memory module 12. More specifically, in one embodiment, the steps illustrated in FIG. 2 may be performed by a controller that may be implemented within the memory module 12—such as, for example, the PIM Controller 97 in the logic portion 95, as shown in FIG. 9. Initially, at block 27, the memory module 12 may receive an instruction from the host 14 to perform a POPCOUNT operation on a bit vector stored in one or more memories in the memory module 12. As mentioned before and as indicated at block 28, the memory module 12 may be the 3DS memory module 13 with one or more memories 18, or may be any other semiconductor-based memory (some examples of which are given before). The 3DS memory module 13 may be an HBM memory module or an HMC memory module. In response to the instruction from the host at block 27, the memory module 12 may execute the POPCOUNT operation within the memory module itself—without transferring the bit vector to the host for execution of the popcount operation, as noted at block 29. Thus, in contrast to the traditional processor/CPU-based execution of the popcount operation, the embodiment in FIG. 2 provides for a memory-based execution of the popcount operation, thereby significantly eliminating the need to transfer large data sets between the host/processor 14 and the memory module 12. The elimination of redundant data movements through such in-memory processing improves instruction execution time and reduces system latency and cache pollution (because of less need to store bit vectors in a cache), while saving system energy and power. The PIM model disclosed herein thus reduces CPU load and frees up the CPU/host for other tasks. Some exemplary details of how the memory module 12 may execute a popcount operation are provided later below with reference to discussion of FIGS. 4-7.

As noted at block 30, after the popcount operation is executed, the memory module 12 may store the result of the processing—that is, the popcount value of the bit vector input at block 27—within the memory module 12. As discussed later, in one embodiment, such result may be stored in a pre-defined storage location within the memory module 12 for submission to the host as a final outcome of the execution of the POPCOUNT operation. Subsequently, at block 31, the memory module 12 may provide or send the result of the popcount operation to the host 14 such as, for example, when the host 14 accesses the memory module 12 to retrieve the result.

Figure 3:
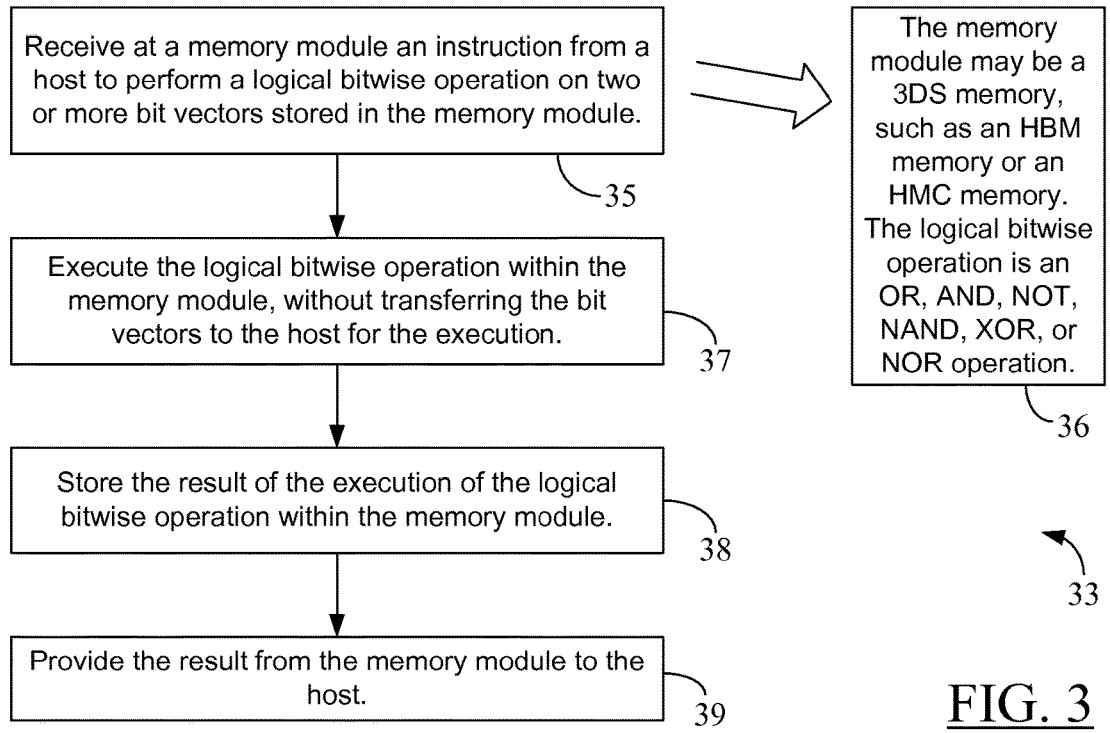
FIG. 3 depicts an exemplary flowchart showing how a logical bitwise operation may be executed according to one embodiment of the present disclosure.

FIG. 3 depicts an exemplary flowchart 33 showing how a logical bitwise operation may be executed according to one embodiment of the present disclosure. Except for its focus on a logical bitwise operation, the flowchart 33 in FIG. 3 is substantially similar to the flowchart 25 in FIG. 2, and, hence, only a brief description of FIG. 3 is provided herein. As in case of FIG. 2, the process illustrated in the flowchart 33 in FIG. 3 also may be performed by the memory module 12. More specifically, in one embodiment, the steps illustrated in FIG. 3 may be performed by a controller—such as, for example, the PIM Controller 97 in FIG. 9—in the logic base 20. Initially, at block 35, the memory module 12 may receive an instruction from the host 14 to perform a logical bitwise operation on two or more bit vectors stored in one or more memories in the memory module 12—such as, for example, the memories 18 in the 3DS memory module 13. As mentioned before and as indicated at block 36, the memory module 12 may be a 3DS memory module, like an HBM memory module or an HMC memory module, and the logical bitwise operation may be, for example, an OR, AND, NOT, NAND, XOR, or NOR operation. An exemplary logical bitwise AND operation is discussed later below in the context of discussion of FIGS. 8A and 8B. Generally, as noted earlier, the memory module 12 may be any semiconductor-based storage system and the logical bitwise operation may be any logical operation regardless of whether it is expressly mentioned here or not. In response to the instruction from the host at block 35, the memory module 12 may execute the specified logical bitwise operation within the memory module itself—without transferring the bit vectors to the host for the execution, as noted at block 37. Thus, the memory-based execution significantly eliminates redundant data movements in the system 10 and improves system performance, while saving system energy and power. The PIM model of execution of logical bitwise operations also reduces CPU load and frees up the CPU/host for other tasks.

As noted at block 38, after the logical bitwise operation is executed, the memory module 12 may store the result of the processing within the memory module 12. As discussed later, in one embodiment, such result may be stored in a pre-defined storage location within the memory module 12 for submission to the host. At block 39, the memory module 12 may provide the result to the host 14 such as, for example, when the host 14 accesses the memory module 12 to retrieve the result.

In the following discussion, details of an in-memory implementation of the popcount operation are provided with reference to FIGS. 4-7 and details of an in-memory implementation of logical bitwise operations are provided with reference to FIGS. 8A-8B. In particular embodiments, the popcount-specific implementations illustrated in FIGS. 4-7 may be suitably modified or shared for bitwise logical operations, as also explained below.

Figure 4:
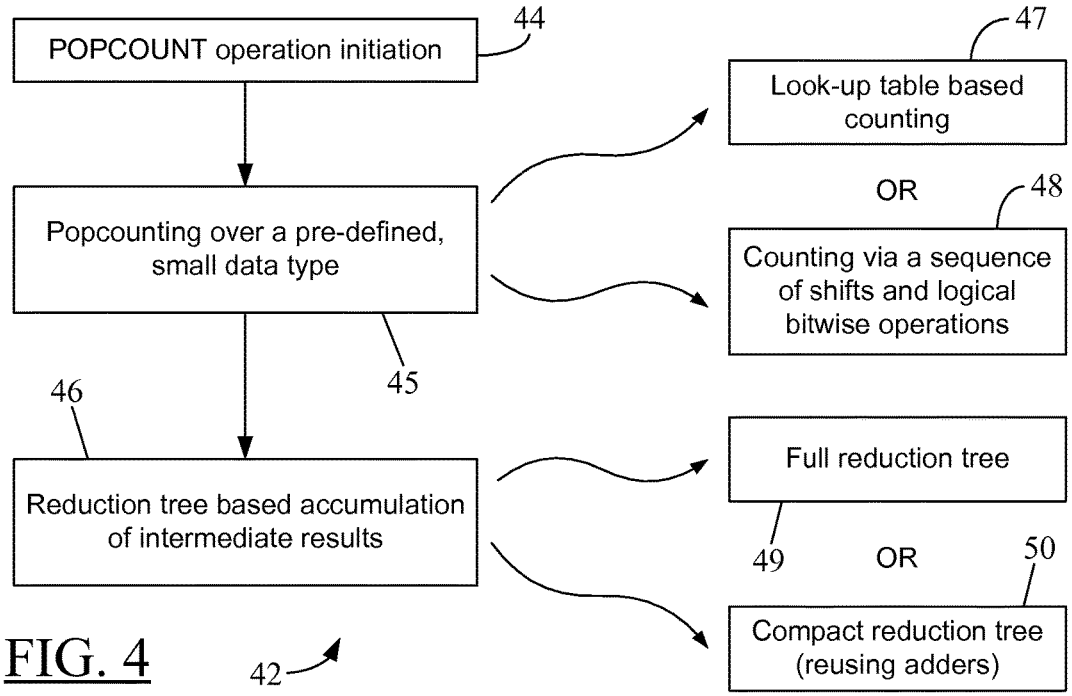
FIG. 4 is an exemplary outline that depicts how a POPCOUNT operation may be executed within the memory modules of FIGS. 1A-1B according to one embodiment of the present disclosure.

FIG. 4 is an exemplary outline 42 that depicts how a POPCOUNT operation may be executed within the memory module 12 of FIG. 1A (or the 3DS memory module 13 of FIG. 1B) according to one embodiment of the present disclosure. In one embodiment, the memory module 12 may initiate the POPCOUNT operation in response to an instruction from the host 14 to perform the popcounting, as noted at block 27 in FIG. 2. The block 44 in FIG. 4 indicates such initiation of the POPCOUNT operation by the memory module 12. In one embodiment, the popcount operation may be implemented in two steps. Initially, as noted at block 45, the memory module 12 may perform popcounting (on a specified bit vector) over a predefined, small data type such as, for example, on each 8-bit portion of the bit vector. Thereafter, as noted at block 46, the memory module 12 may use a reduction tree (discussed later) to accumulate intermediate results and generate the final popcount. Thus, in one embodiment, the results at block 45 may be the inputs for the reduction tree at block 46. More specifically, the operation at block 45 may form the first stage of the reduction tree at block 46, as discussed later with reference to FIGS. 6-7.

As part of the popcounting at block 45, in one embodiment, the memory module 12—for example, the logic die 20 in the 3DS memory module 13—may divide the bits in the bit vector into a plurality of non-overlapping segments of 8 bits each. Then, the memory module 12 may calculate a segment-specific bitcount for each segment. All such segment-specific bitcounts may be then added using a reduction tree to generate the final popcount value. It is understood that a segment of 8-bit length is selected as an example only. In different embodiments, the predefined data type at block 45 may be smaller or larger than 8 bits.

In FIG. 4, two exemplary methods are listed to perform the partial bitcounts at block 45—(i) Look-Up Table (LUT) based counting (block 47), or (ii) counting via a sequence of shifts and logical bitwise operations (block 48). In case of 8-bit segments of the bit vector on which popcounting is to be performed, the LUT may require 256 entries ($2^8$=256)— each entry holds the bit-count result that corresponds to an 8-bit vector segment represented as the address input of the LUT (not shown). In one embodiment, the LUT-based popcounting at block 47 may be performed in a single clock cycle.

Figures 5, 7:
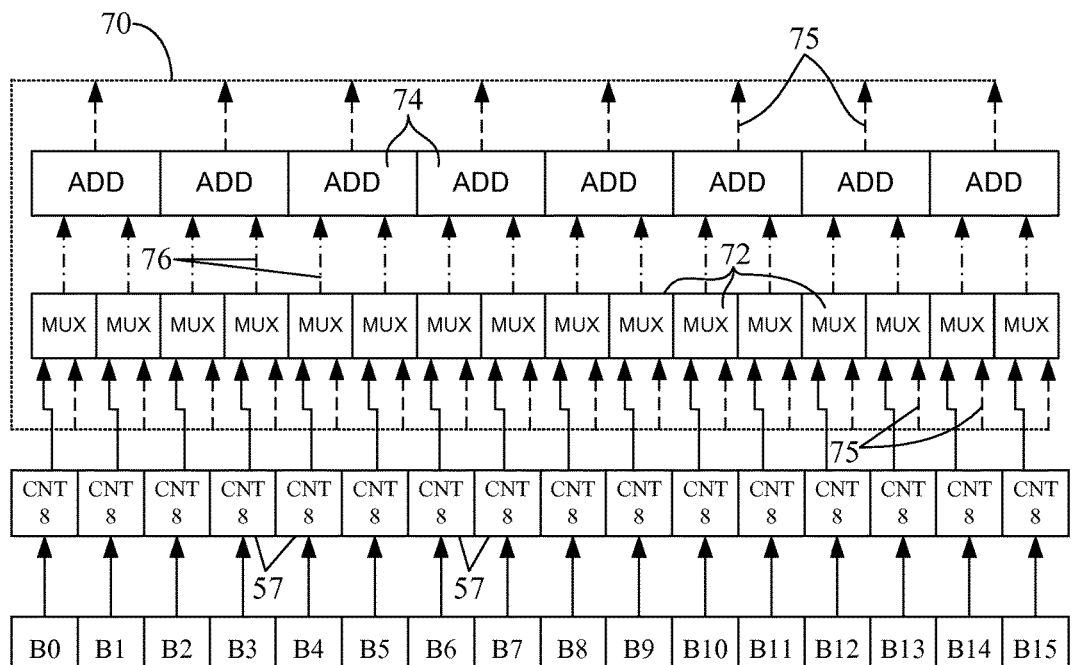
FIG. 5 illustrates an exemplary pseudocode for counting bits in an 8-bit vector segment according to one embodiment of the present disclosure.
FIG. 7 is an example of a compact reduction tree for popcounting 16 bytes of data according to one embodiment of the present disclosure.

Alternatively, as noted at block 48, the bitcounting for an 8-bit vector segment may be implemented via a sequence of shifts and logical bitwise operations. FIG. 5 illustrates an exemplary pseudocode for counting bits in an 8-bit vector segment according to one embodiment of the present disclosure. For ease of association, the same reference numeral "48" is used in FIG. 5 to refer to the pseudocode for the counting operation at block 48 in FIG. 4. In FIG. 5, the logical bitwise operation AND is indicated by the ampersand ("&") sign and bit-shifting is accomplished using different hexadecimal numbers (indicated using the "0x" prefix as, for example, in "0x33333333").

Referring to block 46 in FIG. 4, the popcounts over small data sizes (block 45) may be added, for example, using a reduction tree. Two exemplary configurations of a reduction tree are noted in FIG. 4: (i) a full reduction tree (block 49) as shown in FIG. 6 (discussed below), or (ii) a compact reduction tree (block 50), which may re-use adders to reduce the overall size of the reduction tree as shown in FIG. 7 (discussed below).

Figure 6:
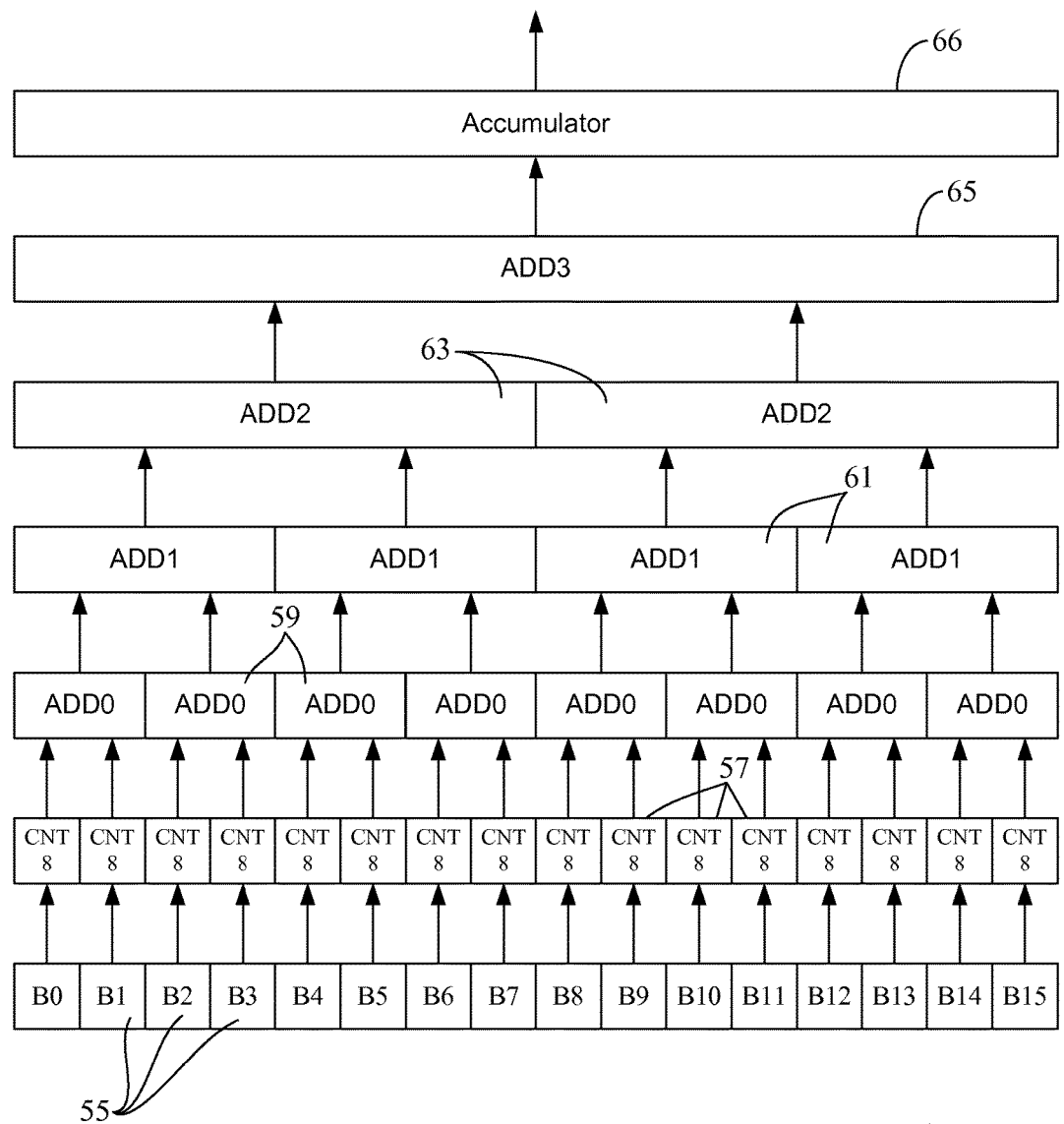
FIG. 6 shows an example of a full reduction tree for popcounting 16 bytes of data according to one embodiment of the present disclosure.

FIG. 6 shows an example of a full reduction tree 49 for popcounting 16 bytes of data according to one embodiment of the present disclosure. In one embodiment, the reduction tree 49 may be a dedicated function block implemented within the memory module 12. In another embodiment, the reduction tree 49 may be implemented as a dedicated function block implemented as a logic unit in the base die 20 of the 3DS memory module 13. In another embodiment, as shown in FIG. 9, such a logic unit may be implemented as part of the PIM Controller 97. In FIG. 6, a 16-byte portion of a bit vector (on which popcounting is to be performed) is identified by 8-bit blocks B0 through B15—collectively identified using the reference numeral "55." Each such 8-bit block is input into a corresponding bitcount unit. All such bitcount units are generically indicated as "CNT8" blocks in FIG. 6 and collectively identified using the reference numeral "57" for ease of illustration. The CNT8 blocks 57 constitute the first stage of the reduction tree 49 and implement the popcount operation noted at block 45 in FIG. 4. Thus, in one embodiment, each CNT8 block in FIG. 6 may perform 8-bit popcounting using the LUT-based approach of block 47 in FIG. 4. Alternatively, in another embodiment, each CNT8 block may perform popcounting over 8 bits using the exemplary pseudocode 48 in FIG. 5, which represents the shift and logical bitwise counting step 48 in FIG. 4. The subsequent levels/stages in the reduction tree 49 may be simple adders. For example, as shown in FIG. 6, the second level of the reduction tree 49 may comprise of the adders indicated as "ADD0" blocks and collectively identified using the reference numeral "59," the third level of the reduction tree 49 may comprise of the adders indicated as "ADD1" blocks and collectively identified using the reference numeral "61," the fourth level of the reduction tree 49 may comprise of the adders indicated as "ADD2" blocks and collectively identified using the reference numeral "63," and the fifth level of the reduction tree 49 may comprise of the adder indicated as the "ADD3" block and identified using the reference numeral "65." As can be seen from FIG. 6, the adders may become wider as addition progresses from the second level 59 to a higher level in the reduction tree 49.

The bitcounts from each pair of CNT8 blocks may be added using a corresponding adder 59 from the second level, the outputs of a pair of adders from the second level may be then added using a corresponding adder 61 from the third level, and so on. Eventually, the output of the adder 65 may be stored in an Accumulator Unit 66, which, in one embodiment, may be the PIMResultRegister 99 shown in FIG. 9 and discussed later below. Thereafter, another 16 byte block of data associated with the bit vector (on which POPCOUNT operation is being performed) may be retrieved from appropriate memory chip(s)—such as the memory chips 18 in FIG. 1B—and applied to the reduction tree 49 for popcounting. In this manner, bitcounts of each 16 byte block of vector data may be accumulated and added in the unit 66 for generating the final result of the POPCOUNT operation on the bit vector under consideration. The final POPCOUNT value may be then retrieved by the processor 14.

FIG. 7 is an example of a compact reduction tree 50 for popcounting 16 bytes of data according to one embodiment of the present disclosure. In contrast to the full reduction tree 49 in FIG. 6, the compact reduction tree 50 in FIG. 7 reuses the same set of adders for every reduction iteration associated with a given popcounting operation. As a result, the implementation in FIG. 7 may reduce the number of adders, but may increase the cost of the time required to execute the reduction. It may also increase the complexity of the routing matrix because of the need to use outputs of adders in one level as the inputs of the adders in the next level. In one implementation, the compact reduction tree 50 may include a generic adder unit 70 that may be shared by other components in the memory module 12—such as, for example, the components in the base die 20 in the memory module 13. In one embodiment, the compact reduction tree 50 may be included as part of the PIM Controller 97 shown in FIG. 9. The adder unit 70 is shown dotted in FIG. 7. The inputs to the adder unit 70 may be the initial popcounts from the CNT8 units 57 (representing block 45 in FIG. 4). The adder unit 70 may include a plurality of multiplexers—indicated as the "MUX" blocks and collectively identified using the reference numeral "72"—to receive corresponding inputs from the CNT8 blocks 57 forming the first stage of the reduction tree. The multiplexers 72 may also receive a second set of inputs in the form of the outputs of the "ADD" blocks in the adder unit 70. The "ADD" or adder blocks are collectively identified using the reference numeral "74." The second set of inputs to the MUX blocks 72 are shown by dashed arrows 75 having the pattern "- - - - -". On the other hand, the outputs of the MUX units 72 are shown by dashed arrows 76 having the pattern "- • - • -" to distinguish them from the arrows 75 as well as to indicate the iterative nature of output generation when adders 74 are re-used.

Although not shown in FIG. 7, in one embodiment, the final bitcount generated by the adder unit 70 for each 16 byte data block may be stored in an accumulator. In one embodiment, one of the adders 74 may be configured to serve as the accumulator. With each loop in the adder unit 70, the parameters are reduced to half. In the last round of iteration, only two parameters remain, and the sum of these two parameters would be the final result of the popcounting operation. In one embodiment, such final result may be transferred to a storage location within the memory module 12 for retrieval by the host 14. In the embodiment of FIG. 9, such storage location is the PIMResultRegister 99. In another embodiment, the adder 74 serving as the accumulator may itself function as the PIMResultRegister 99.

In one embodiment, the reduction-tree based implementations in FIGS. 6-7 may be used to compute popcounts on vectors of up to one DRAM page in size. The DRAM page size may be fixed and pre-defined. For example, in one embodiment, the DRAM page size may be 1 KB. However, the DRAM page size may be different in different systems. As discussed later, in one embodiment, for vector sizes larger than one DRAM page, the in-memory PIM Controller 97 shown in FIG. 9 may be used. For bitcounts of vectors smaller than one DRAM page, the PIM Controller or other suitable entity in the memory module 12 (or in the logic die 20 in case of the memory module 13) may enable only a subset of the reduction tree 49 or 50—either through disabling a subset of the initial adders (like the adders 59 in FIG. 6) in the reduction tree or masking out a portion of the reduction tree. For example, a "mask" may be added to the first stage of a reduction tree 49-50 such that the output of a "CNT8" block 57 is zero unless an enable bit associated with that block is set to "1." In this approach, every CNT8 module 57 may be augmented with an enable bit that controls whether the result is "0" or the real bit count value. Such selective enabling turns off counting for vectors that are less than a pre-defined size—here, one DRAM page. As mentioned above, in one embodiment, the enable signals (or a "mask vector") may be regulated by the PIM Controller 97 (FIG. 9).

On the other hand, bitcount operations for a vector that spans multiple DRAM pages may require multiple steps. In case of the DRAM page size of 1 KB, each step may calculate the bitcount for a 1 KB subset of the vector and partial results may be accumulated in a special register within the memory module 12 (or in the base die 20 in case of the memory module 13). In one embodiment, the special register is the PIMResultRegister 99 shown in FIG. 9. The final popcount value may be generated by adding all such partial results.

When executing popcounts over large vectors that span multiple DRAM pages, the memory module 12 may need to know all the page addresses that the vector is stored at. Hence, after the first DRAM page of the vector is processed, the memory module 12 may need to figure out the subsequent pages where the vector resides. In one embodiment, a Direct Memory Access (DMA)-like mechanism may be implemented when multiple pages need to be traversed. In such an implementation, the physical addresses of the DRAM pages the vector occupies may be sent to the memory module 12, for example, by the host 14. These pages may be then traversed by an internal controller within the memory module, such as, for example, the PIM Controller 97 in FIG. 9.

The foregoing discussion related to a DRAM page size is only exemplary in nature. In case of semiconductor memories which are not DRAMs, a similar approach may be used for memory pages in such non-DRAM memories.

The PIM model based popcounting approach discussed herein may be quite useful in cryptography. For example, to judge the encryption quality of a certain algorithm, there may be a need to run many different bit patterns on that algorithm. A good encryption algorithm should preferably produce equal number of 1's and 0's so that the output code looks completely random. An encryption output with unbalanced 1's and 0's may be an indicator of a poor algorithm. The popcounting thus becomes a dominant factor of such verification process. The in-memory popcounting as per teachings of the present disclosure can significantly accelerate this verification process. In a cryptography application, the data to be counted (such as, for example, the output code generated by an encryption algorithm) may be a stream of data without any spatial locality. Thus, it makes more sense to perform popcounting on such data only inside the memory. (Such data already may be stored in the memory by the host.) Furthermore, the PIM model-based popcounting as per teachings of the present disclosure can also be used as part of several different "attacks" (i.e., attempts at encryption deciphering).

Figures 8A, 8B:
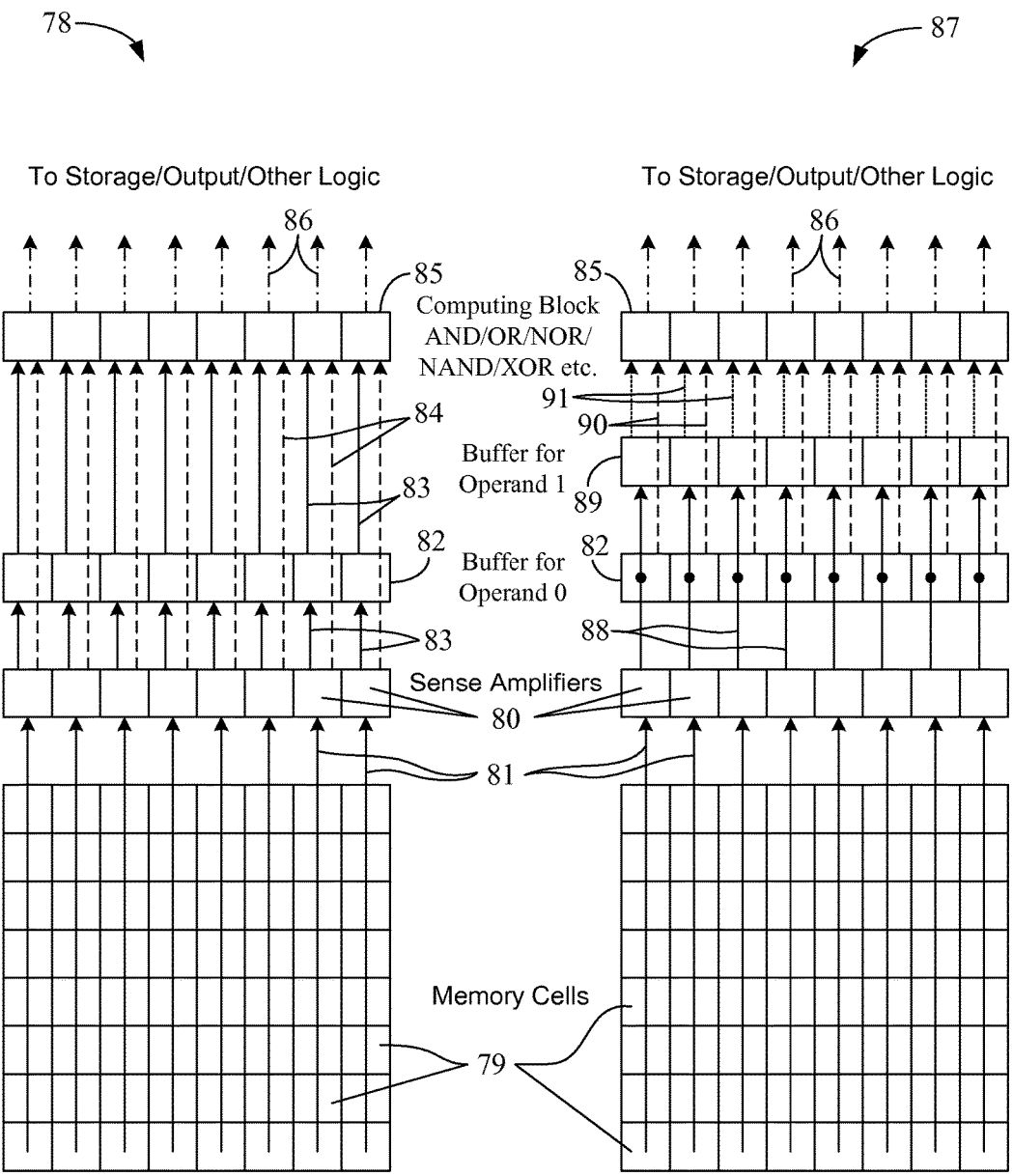
FIGS. 8A-8B show two exemplary implementations of how logical bitwise operations may be executed within the memory module of FIG. 1A according to particular embodiments of the present disclosure.

FIGS. 8A-8B show two exemplary implementations of how logical bitwise operations may be executed within the memory module 12 of FIG. 1A according to particular embodiments of the present disclosure. FIG. 8A illustrates a single buffer-based PIM implementation 78, whereas FIG. 8B illustrates a dual buffer-based PIM implementation 87. The configuration in FIG. 8A or FIG. 8B may be implemented as part of the memory module 12. In one embodiment, either of these configurations may be implemented as part of the PIM Controller 97 shown in FIG. 9. For ease of reference, common components between FIGS. 8A and 8B have been identified using the same reference numerals. Although the embodiments of FIGS. 8A and 8B illustrate bitwise logical operations on two 8-bit vectors, such illustrations are exemplary only. In practice, the configurations shown in FIGS. 8A-8B may be extended to any number (>2) of bit vectors and to bit vectors of any length (more or less than 8 bits).

For a logical bitwise operation between two 8-bit operands in the embodiment of FIG. 8A, the 8 bits of one of the two operands may be transferred or "read" from appropriate memory cells 79 by corresponding sense amplifiers 80, as indicated by unbroken arrows 81. The memory cells 79 may be memory cells of any semiconductor memory such as, for example, the memory module 12 in FIG. 1A or the 3DS memory module 13 in FIG. 1B. The first operand (an 8-bit vector) may be referred to herein as "Operand 0." The sense amplifiers 80 may transfer the received content to a buffer 82 for Operand 0, as indicated by unbroken arrows 83. In the embodiment of FIG. 8A, the second 8-bit operand (referred to herein as "Operand 1") for the logical bitwise operation may be received by the sense amplifiers 80 from the respective memory cells 79. As indicated by dashed arrows 84 having the pattern "- - - - -", the sense amplifiers 80 may directly transfer this Operand 1 to a computing block 85, which receives the Operand 0 from the buffer 82 (as indicated by arrows 83).

The computing block 85 may contain the necessary logic to perform the appropriate logical bitwise operation as instructed, for example, by the host 14. In that regard, in particular embodiments, the computing block 85 may share some logic units or logic circuitry with the portion of the memory module 12 implementing POPCOUNT operations. The logical bitwise operation may include any of a number of different logical operations such as, for example, AND, OR, NOR, NAND, XOR, and the like. Upon conclusion of the designated logical bitwise operation between Operand 0 and Operand 1, the computing block 85 may generate an output, which may be transferred to a storage within the memory module 12, or to other logic block within the memory module 12, or to an appropriate output unit within the memory module 12 for eventual delivery to the host 14. In one embodiment, such storage or output unit within the memory module 12 may be the PIMResultRegister 99 shown in FIG. 9. In the embodiment of FIG. 8A, such output is indicated by dashed arrows 86 having the pattern "- • - • -". As an example, the Operand 0 may be the bit vector "11010010" whereas the Operand 1 may be the bit vector "10001111." In case of a logical bitwise AND operation between these two bit vectors, the computing block 85 would generate the output vector "10000010" at the arrows 86.

In the embodiment of FIG. 8B, the sense amplifiers 80 transfer each operand—Operand 0 and Operand 1—to its own buffer, as indicated by unbroken arrows 88. The Operand 0 is stored in the first buffer 82 (as in the embodiment of FIG. 8A), whereas the Operand 1 is stored in a second buffer 89. Thus, in contrast to the embodiment in FIG. 8A, the sense amplifiers 80 do not directly supply the second operand to the computing block 85 in the embodiment of FIG. 8B. Each operand is initially buffered in its respective buffer 82 or 89. The buffered operands are then sent to the computing block 85 for the desired logical operation, as indicated by the dashed arrows 90 having the pattern "- - - - -" and by the dashed arrows 91 having the pattern " . . . . . . . . . . . . . ". As in case of the embodiment in FIG. 8A, the computing block 85 may operate on the received pair of operands and generate an output at arrows 86.

FIG. 9 illustrates an exemplary layout of a logic portion 95 of the memory module 12 in FIG. 1A according to one embodiment of the present disclosure. The components illustrated in the logic portion 95 may be implemented within the memory module 12. For the sake of brevity, only the components relevant to the present disclosure are shown in FIG. 9 and discussed herein. In case of the 3DS memory module 13 in FIG. 1B, the logic base 20 may be configured to include the components similar to those shown in the logic portion 95. Hence, the discussion of FIG. 9 equally applies to the embodiment in FIG. 1B as well.

As shown in FIG. 9, the logic portion 95 may implement a PIM Controller 97 (also referred to herein as "the controller") operatively connected to a PIMResultRegister 99 (also referred to herein as "the result register"). In one embodiment, the controller 97 may include the hardware logic and necessary software for implementing the POPCOUNT and the logical bitwise operations on bit vectors stored in the semiconductor memory chip(s) (not shown) in the memory module 12. In the embodiment of FIG. 1B, such memory chips are the chips 18. As noted earlier, for example, the controller 97 may include the hardware, such as the reduction tree 49 or 50 in FIGS. 6-7 and/or the logic structure 78 or 87 in FIGS. 8A-8B, and software, such as the pseudo-code 48 in FIG. 5, for performing the steps at blocks 44-46 in FIG. 4 as well as the steps shown in the flowcharts in FIGS. 2-3. Thus, using the controller 97, the memory module 12 may accomplish the in-memory execution of POPCOUNT and logical bitwise operations. The PIM Controller 97 may perform a number of tasks to facilitate the in-memory processing discussed herein. Such tasks may include, for example, providing an interface (API) to enable the host 14 to initiate commands and fetch data, interacting with the host 14, controlling the implemented reduction tree 49 or 50, controlling the operation of the logic structure 78 or 87, handling computation of popcounts over vectors spanning multiple memory pages, accumulating intermediate results of bit-counting in the PIMResultRegister 99 and generating the final popcount value for storage in the result register 99.

The PIM Controller 97 may communicate with the host 14 via a Host Link Interface and Control Unit 101 (simply, "the host interface unit") and with the memory chips (such as, for example, the DRAM dies 18 in the embodiment of FIG. 1B) via a Memory Interface and Control Unit 103 (simply, "the memory interface unit"). The host interface unit 101 may support data transfer over the high-speed links 16, whereas the memory interface unit 103 may facilitate data transfer via internal connections such as, for example, the earlier-mentioned through-silicon vias (TSVs). These interfaces 101, 103 may be operatively coupled to the controller 97, and may be under the operational control of the controller 97, which may also provide the necessary timing and control signaling to coordinate the operations of these units. The controller 97 may initially receive the bit vectors from the host via the host interface unit 101 and store them in one or more memory locations (or memory cells) in the memory chip(s) of the memory module 12 using the memory interface unit 103. During popcounting or logical bitwise operations, the memory interface unit 103 may retrieve the appropriate bit vector(s) from their physical storage and supply them to the PIM Controller 97 for in-memory execution of these operations. In some embodiments, multiple instances of the memory interface unit 103 may be implemented, with each instance configured to control a respective bank of the memory chips in the memory module 12. The details of memory bank selection, row/column access, and data transfer to/from a memory bank in a memory chip (in the memory module 12) by the controller 97 are not relevant to the present disclosure, and hence are not discussed herein.

The logic portion 95 may also include a Self Test and Error Detection/Correction Unit 105 (simply, "the error control unit") coupled to the memory interface unit 103 and the host interface unit 101. The error control unit 105 may apply an appropriate Error Correcting Code (ECC) to encode the data received from the host 14 prior to storing the data into the memory chips (such as, for example, the DRAM chips 18 in the embodiment of FIG. 1B). When this data is read back from the memory chips in the memory module 12, one or more errors in the data may be detected and/or corrected depending on the ECC scheme used to encode the initial data. Furthermore, the error control unit 105 may routinely perform "self-test" procedures to preserve the integrity of the data stored in the memory chips.

The controller's 97 interaction with the host 14—through the host interface unit 101—is now described, primarily with reference to the implementation of the POPCOUNT operation. In one embodiment, the communication between the host 14 and the controller 97 may be done via writes and reads to a set of "PIM-specific addresses," which may be one or more pre-defined storage locations within the memory module 12 or configuration addresses of such locations. Some examples of a pre-defined storage location include an existing register in the logic portion 95, a memory cell in one of the memory chips in the memory module 12, or a (new) special-purpose register implemented in the logic portion 95. The PIM Controller 97 may provide an API to the host 14 when the memory module 12 is first connected to the host 14 via the high-speed link(s) 16 such as, for example, when the memory module 12 is first installed in the system 10. When a POPCOUNT related instruction is encountered in the program being executed by the processor 14, the API may "divide" the popcounting process into a set of functions that facilitates in-memory implementation of the POPCOUNT operation. In one embodiment, the PIM-specific addresses may be part of the system configuration that the host 14 is aware through the system's 10 Basic Input Output System (BIOS). The API may provide the host with an access to these PIM-specific addresses to enable in-memory execution of the POPCOUNT operation.

The API may inform the host about the association between a pre-defined address and a corresponding function (discussed below) so that the host can perform the read or write operations for a given function. The PIM Controller 97 is also aware of which storage locations to access—for example, to store the final popcount for the host to read or to retrieve any information received from the host. Some exemplary functions that may be provided through the API to enable the PIM Controller 97 to communicate with the host 14 to facilitate in-memory execution of the popcount operation are:

(i) void POPCOUNT(*p_vector, size): This function may translate into two subsequent write operations by the host to a pre-defined PIM-specific address. The first write operation indicates the start address—i.e., a physical memory address—of the bit vector on which popcounting is to be performed, and the second write operation indicates the size of the vector. This function may be applicable, for example, when the vector size is less than one memory page or when the vector spans multiple consecutive memory pages. The physical memory address may be associated with one of the memory chips in the memory module 12.

(ii) void IsDone( ): This function may indicate whether the last operation is completed or not. The last operation may be, for example, the popcounting of the last, pending portion of a bit vector. This function may translate into a single read operation (by the host) from a pre-defined PIM-specific address. As part of this read operation, the memory module 12 may return a "1" to indicate that the relevant PIM operation is completed, or a "0" otherwise. This approach may be used where there is no feedback mechanism to the host 14 exists in the memory module 12. In another embodiment, where the memory module 12 has a feedback mechanism to the host 14, the memory module 12 may send a message to the host 14 to indicate that the PIM operation is done.

(iii) data_t ReadResult( ): This function may return the result of the last popcount. This function may also translate into a read operation (by the host) from a predefined PIM-specific address. As noted before, the final popcount value may be initially accumulated in the PIMResultRegister 99. This popcount value may be then transferred by the controller 97 to a pre-defined storage location (or PIM-specific address) for reading by the host using this function.

In one embodiment, when a vector spans multiple memory pages (which may or may not be consecutive), the host 14 may explicitly specify all physical pages or memory addresses the vector resides at. In other words, the host 14 may provide the physical address of a memory location in the memory module 12 where a respective portion of the bit vector is stored. The host 14 can do this through a designated write operation to a pre-defined PIM-specific address. For example, the host 14 may use an API-provided function "void PhysicalPage(*p_page)" to notify the controller 97 of the physical address of the next page where the current vector being operated on is stored. The PIM Controller 97 may track these addresses and initiate the partial popcount for every memory page containing the bit vector. The host 14 may provide the physical addresses all at once, or sequentially at pre-determined intervals. The received physical addresses may be stored at a single storage location (or PIM-specific address) or at multiple storage locations. More specifically, the controller 97 may initially store each received physical address in its corresponding PIM-specific address (or storage location) and then access that storage location to obtain the received physical address to retrieve the respective portion of the bit vector from the corresponding memory location to perform a partial bitcount on the retrieved portion. The PIM Controller 97 may combine results of all partial bitcounts to effectuate the execution of the POPCOUNT operation on the bit vector. The partial bitcounts may be accumulated in the PIMResultRegister 99, as mentioned before. The final bitcount—generated by combining all partial bitcounts—may be initially stored in the result register 99 and then transferred to the relevant PIM-specific address for submission to the host as the final outcome of the execution of the POPCOUNT operation. As noted before, the host 14 may use the "data_t ReadResult( )" function to read this final outcome.

As mentioned before, the present disclosure is also directed to in-memory logical bitwise operations over large vectors. One reason for implementing such operations in-memory is that the logical bitwise operations are often used alongside the popcount operation in real-time analytics workloads. For example, if a website is using bitmaps to track visitors for each webpage, then ORing of two bitmaps (or bit vectors) associated with two web pages may indicate what number of users visited at least one of these web pages. In a CPU-based implementation, both vectors are transferred from the memory (where the vectors are stored) to the CPU (where the logical operation is performed). An in-memory implementation may eliminate half of the data being transferred over the system bus because the in-memory implementation will only transfer the final result of the logical bitwise operation. This may provide significant savings in redundant data movements, especially when the bit vectors are large. Furthermore, the common use-case may typically involve bitwise operations—such as, for example, ORing or ANDing—between many vectors, rather than just two vectors. Also, in the common use-case, the bitwise operations often end with a popcount of the final vector resulting from the bitwise logical operation. In this scenario, the reduction in data transfers offered by the in-memory implementations of popcounts and logical bitwise operations may be more dramatic because all intermediate results are saved within the memory module 12 and are not sent to the host 14 over the system bus. Thus, implementing the logical bitwise operations within the memory module 12 (or the module 13) may provide the necessary foundation for enabling offloading of real-time analytics workloads through PIM.

As indicated at block 36 in FIG. 3, the PIM model according to teachings of the present disclosure may be configured to implement any logical bitwise operation within the memory module 12 (or the module 13) such as, for example, OR, AND, NOT, NAND, NOR, and XOR operations. The in-memory implementation of a bitwise logical operation may share many similarities with the popcount implementation. FIGS. 8A-8B provide two exemplary embodiments showing in-memory implementations of bitwise operations. Furthermore, the earlier discussion of FIGS. 4-7 and FIG. 9 remains applicable in the context of the PIM model for logical bitwise operations as well, albeit with suitable modifications as briefly described below.

It is observed with reference to FIGS. 8A-8B that the in-memory implementation of logical bitwise operations may be much simpler than the implementation of a popcount operation. For example, there may be no need for a full reduction tree, like the reduction tree 49 in FIG. 6, in case of the bitwise operations. The CNT8 blocks 57 may be replaced with the appropriate logical operation. For example, in case of the logical OR operation, only a single stage of adders may be needed in the computing block 85. The single stage may be achieved, for example, by replacing each CNT8 module 57 with a logical operation adder. Similar to the earlier discussion of vector sizes for popcounting, in case of vector sizes smaller than one memory page, the logical bitwise operation may be implemented through masks that disable unnecessary adders. Larger vector sizes may be computed in multiple steps, and temporal results may be accumulated in the PIMResultRegister 99 in a manner similar to that discussed before in the context of the popcount operation. As before, the PIM Controller 97 may orchestrate and manage these computations. The PIM Controller 97 may also augment the API-supported host interface with additional functions, each corresponding to the specific logical bitwise operation. For example, a logical bitwise OR operation on two vectors may use the following semantic:

data_t OR(*p_vec1, *p_vec2, size): This function may translate into three write operations by the host 14 to pre-defined PIM-specific addresses (or storage locations). The first write operation may specify the physical memory address of the first vector, the second write operation may specify the physical memory address of the second vector, and the third write operation may specify the sizes of the two vectors.

Thus, the earlier discussion of in-memory implementation of popcounting in the context of FIGS. 4-7 and FIG. 9 remains applicable to the in-memory implementation of logical bitwise operations as well. Briefly, for example, in case of a logical bitwise operation on multiple vectors, the PIM Controller 97 may initially receive from the host 14 the physical addresses of memory locations (like the memory cells 79 shown in FIGS. 8A-8B) in the memory module 12 where the respective bit vectors are stored, and then store each received physical address at a PIM-specific address (or storage location) within the memory module 12. The controller 97 may access the appropriate storage location to obtain the corresponding physical address and then retrieve the respective bit vector from the specified memory location. In one embodiment, the controller 97 may divide each bit vector into a plurality of bit vector-specific non-overlapping segments and then align corresponding bit vector-specific segments from all bit vectors into a plurality of groups of aligned segments. The controller 97 may then perform the bitwise operation on each group of aligned segments to thereby generate a plurality of partial results. As before, the partial results may be stored in the PIMResultRegister 99. The controller 97 may subsequently combine all partial results in the register 99 to effectuate the execution of the logical bitwise operation. The final outcome from the combination may be initially stored in the PIMResultRegister 99 before eventually storing it at a pre-defined storage location (or PIM-specific address) for future submission to the host 14. The host 14 may access this storage location to read the result.

It is noted that the above-described principles of in-memory executions of POPCOUNT and logical bitwise operations in the context of the memory module 12 may be applicable to a Solid State Drive (SSD) or any semiconductor-based storage system. For example, in the context of an SSD, the bitcount operation may be implemented in the SSD controller, thereby saving redundant transfers back and forth from the CPU. In one embodiment, however, the bitcount operation also may be implemented—along with any other reduction operation—closer to the flash memory storage cells in the SSD, thus reducing both traffic and contention over the internal SSD bus. In this case, the reduction operation may be executed within the flash die itself rather than in the SSD controller. Again, for the sake of brevity, additional details of such implementations are not discussed herein because of detailed discussion of the exemplary embodiments in FIGS. 4-9.

Figure 10:
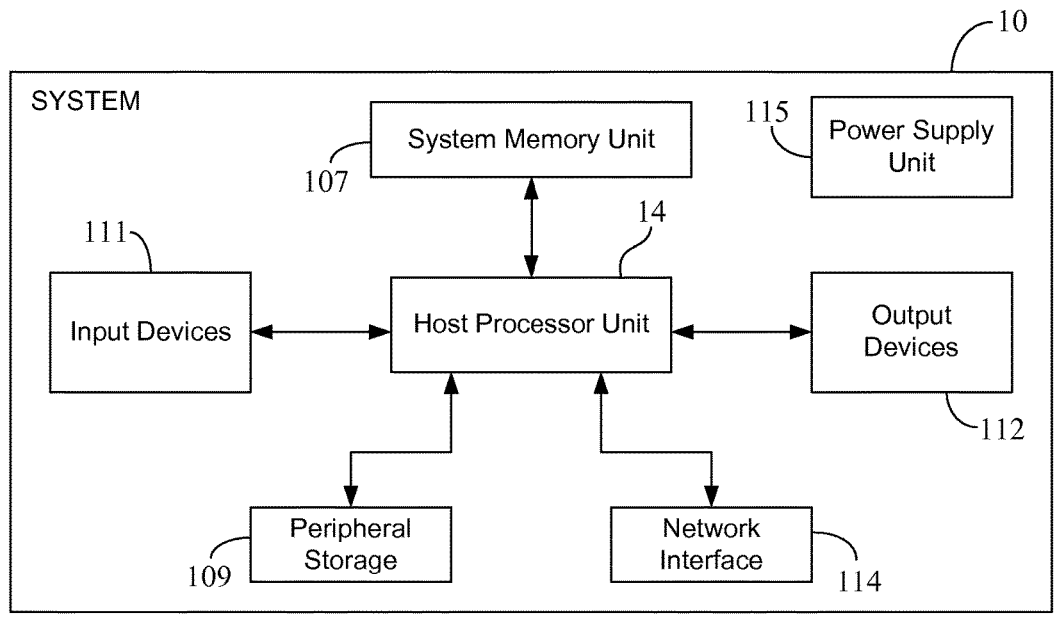
FIG. 10 depicts an overall layout of the system in FIG. 1A according to one embodiment of the present disclosure.

FIG. 10 depicts an overall layout of the system 10 (incorporating the memory unit 12) in FIG. 1A according to one embodiment of the present disclosure. Hence, for ease of reference and discussion, the same reference numerals are used in FIGS. 1A and 10 for the common system components/units.

In FIG. 10, the host processor unit 14 is shown coupled to a system memory unit 107 as well as to a peripheral storage unit 109, one or more input devices 111, one or more output devices 112, and a network interface unit 114. In some embodiments, the system 10 may include more than one instance of the devices or units shown. Some examples of the system 10 include a computer system (desktop or laptop), a tablet computer, a mobile device, a cellular phone, a video gaming unit or console, a machine-to-machine (M2M) communication unit, a stateless "thin" client system, or any other type of computing or data processing device. In various embodiments, the system 10 may be configured as a rack-mountable server system, a standalone system, or in any other suitable form factor. In some embodiments, the system 10 may be configured as a client system rather than a server system.

In particular embodiments, the host processor unit 14 may include more than one CPUs, and/or the system 10 may include more than one processor units 14 (e.g., in a distributed processing configuration). When the system 10 is a multiprocessor system, there may be more than one instance of a CPU or processor. As mentioned earlier, the host 14 may be a System on Chip (SoC).

The memory unit 107 may include at least one memory module, like the memory module 12 in FIG. 1. As mentioned earlier, the memory module 12 may be any semiconductor-based storage system such as, for example, DRAM, SRAM, PRAM, RRAM, CBRAM, MRAM, STT-MRAM, and the like In some embodiments, the memory unit 107 may include at least one 3DS memory module in conjunction with one or more non-3DS memory modules. The non-3DS memory may include DDR/DDR2/DDR3/DDR4 SDRAM, Rambus® DRAM, flash memory, and of various types of Read Only Memory (ROM), etc. Also, in some embodiments, the system memory 107 may include multiple different types of semiconductor memories, as opposed to a single type of memory. In any event, the system memory unit 107 may comprise at least one logic base (or logic die)—like the logic portion 95 in FIG. 9—that enables the memory unit 107 to execute POPCOUNT and logical bitwise operations within the memory unit 107 as per teachings of the present disclosure.

The peripheral storage unit 109, in various embodiments, may include support for magnetic, optical, magneto-optical, or solid-state storage media such as hard drives, optical disks (such as CDs or DVDs), non-volatile RAM devices, etc. In some embodiments, the peripheral storage unit 109 may include more complex storage devices/systems such as disk arrays (which may be in a suitable RAID (Redundant Array of Independent Disks) configuration) or Storage Area Networks (SANs), which may be coupled to the processor 14 via a standard Small Computer System Interface (SCSI), a Fibre Channel interface, a Firewire® (IEEE 1394) interface, or another suitable interface. In one embodiment, the peripheral storage unit 109 may be coupled to the processor 14 via a standard peripheral interface such as, for example, the Peripheral Component Interface Express (PCI Express™) standard based interface, the Universal Serial Bus (USB) protocol based interface, or the IEEE 1394 (Firewire®) protocol based interface.

In particular embodiments, the input devices 111 may include standard input devices such as a computer keyboard, mouse or other pointing device, a touchpad, a joystick, or any other type of data input device. The output devices 112 may include a graphics/display device, a computer screen, an audio speaker, an alarm system, a CAD/CAM (Computer Aided Design/Computer Aided Machining) system, a video game station, or any other type of data output or process control device. In some embodiments, the input device(s) 111 and the output device(s) 112 may be coupled to the host processor unit 14 via an I/O or peripheral interface(s).

In one embodiment, the network interface 114 may communicate with the host processor unit 14 to enable the system 10 to couple to a network (not shown). In another embodiment, the network interface 114 may be absent altogether. The network interface 114 may include any suitable devices, media and/or protocol content for connecting the system 10 to a network—whether wired or wireless. In various embodiments, the network may include Local Area Networks (LANs), Wide Area Networks (WANs), wired or wireless Ethernet, telecommunication networks, or other suitable types of networks.

The system 10 may include an on-board power supply unit 115 to provide electrical power to various system components illustrated in FIG. 10. The power supply unit 115 may receive batteries or may be connectable to an AC electrical power outlet. In one embodiment, the power supply unit 115 may convert solar energy into electrical power.

In the preceding description, for purposes of explanation and not limitation, specific details are set forth (such as particular architectures, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein, such as, for example, in FIGS. 1A-1B and 6-10, can represent conceptual views of illustrative circuitry or other functional units embodying the principles of the technology. Similarly, it will be appreciated that the flow charts herein, such as, for example, in FIGS. 2-4 may represent various processes or innovative aspects which may be substantially performed by a controller such as, for example, the PIMController 97 in FIG. 9, without transferring the processing to the host unit 14. In particular embodiments, the controller or the host processor may include, for example, a general purpose processor, a special purpose processor, a conventional processor, a digital signal processor (DSP), a plurality of microprocessors, one or more microprocessors in association with a DSP core, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 2-4 may be provided in the hardware.

When certain inventive aspects require software-based processing, such software or program code may reside in a computer-readable data storage medium (not shown). Such data storage medium may be part of the peripheral storage 109 in the embodiment of FIG. 10, or may be part of the internal memory of the PIM Controller 97 in FIG. 9. The host 14 or the controller 97 may execute relevant instructions stored on such a medium to carry out the software-based processing. Such relevant instructions may include, for example, the pseudo-code shown in FIG. 5 and different API-provided functions discussed earlier, as well as any ancillary program code that may be needed to effectuate the PIM functionality discussed herein. The computer-readable data storage medium may be a non-transitory data storage medium containing a computer program, software, firmware, or microcode for execution by a general purpose computer or a processor mentioned above. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

Alternative embodiments of the PIM model according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, the functions of some of the elements in the system 10—such as, for example, the PIMController 97 and the host unit 14—may be provided through the use of hardware (such as logic circuits) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a PIM model in which computations related to the popcount and logical bitwise operations are implemented within a memory module and not within a CPU, thereby eliminating the need to shift data from large bit vectors throughout the entire system. By off-loading the processing of these operations to the memory, the redundant data transfers over the memory-CPU interface are greatly reduced, thereby improving system performance and energy efficiency. The disclosed PIM approach may find beneficial applications, for example, in cryptography and in real-time analytics. The memory module may be any semiconductor memory. A controller and a dedicated register in the logic die of the memory module may operate to interface with the host and provide in-memory executions of popcounting and logical bitwise operations requested by the host. The PIM model as per teachings of particular embodiments of the present disclosure thus frees up the CPU for other tasks because many real-time analytics tasks can now be executed within a PIM-enabled memory itself.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method comprising:
   receiving at a memory module an instruction from a host to perform a POPCOUNT operation on a bit vector stored in the memory module; and
   executing the POPCOUNT operation within the memory module, without transferring the bit vector to the host for the execution, wherein executing the POPCOUNT operation includes:
      dividing bits in the bit vector into a plurality of non-overlapping segments,
      calculating a segment-specific bitcount for each of the plurality of non-overlapping segments, and
      adding all segment-specific bitcounts to generate a result.

2. The method of claim 1, further comprising:
   storing the result of the execution of the POPCOUNT operation within the memory module; and
   providing the result from the memory module to the host.

3. The method of claim 1, wherein each segment includes 8 bits.

4. The method of claim 1, wherein calculating the segment-specific bitcount includes one of the following:
   using a Look-Up Table (LUT) stored in the memory module to obtain the segment-specific bitcount; and
   performing a sequence of shifts and logical bitwise operations on each of the plurality of non-overlapping segments to generate the segment-specific bitcount.

5. The method of claim 1, wherein adding all segment-specific bitcounts includes:
   using each segment-specific bitcount as an input to a corresponding one of a plurality of adders within the memory module; and
   accumulating outputs of all adders in the plurality of adders to generate the result.

6. The method of claim 1, wherein the memory module is one of the following:
   a Three Dimensional Stack (3DS) memory module;
   a High Bandwidth Memory (HBM) module;
   a Hybrid Memory Cube (HMC) memory module;
   a Solid State Drive (SSD);
   a Dynamic Random Access Memory (DRAM) module;
   a Static Random Access Memory (SRAM);
   a Phase-Change Random Access Memory (PRAM);
   a Resistive Random Access Memory (ReRAM);
   a Conductive-Bridging RAM (CBRAM);
   a Magnetic RAM (MRAM); and
   a Spin-Transfer Torque MRAM (STT-MRAM).

7. The method of claim 1, wherein the bit vector is generated by an encryption algorithm.

8. The method of claim 7, further comprising:
   determining encryption quality of the encryption algorithm based on a result of the execution of the POPCOUNT operation.

9. A method comprising:
   receiving at a memory module an instruction from a host to perform a POPCOUNT operation on a bit vector stored in the memory module; and
   executing the POPCOUNT operation within the memory module, without transferring the bit vector to the host for the execution, wherein executing the POPCOUNT operation includes:
      receiving from the host a physical address of a memory location in the memory module where a respective portion of the bit vector is stored, for each received physical address, retrieving the respective portion of the bit vector from the memory location, performing a partial bitcount on the retrieved portion of the bit vector, and combining results of all partial bitcounts to effectuate the execution of the POPCOUNT operation on the bit vector.

10. The method of claim 9, further comprising:
storing each received physical address in a pre-defined storage location within the memory module;
accessing the pre-defined storage location to obtain each received physical address for retrieving the respective portion of the bit vector; and
storing a combined result of all partial bitcounts in the pre-defined storage location for submission to the host as a final outcome of the execution of the POPCOUNT operation.

11. A method comprising:
receiving at a memory module an instruction from a host to perform a logical bitwise operation on two or more bit vectors stored in the memory module; and
executing the logical bitwise operation within the memory module, without transferring the bit vectors to the host for the execution, wherein executing the logical bitwise operation includes:
dividing each bit vector into a plurality of bit vector-specific non-overlapping segments,
aligning corresponding bit vector-specific segments from all bit vectors into a plurality of groups of aligned segments,
performing the logical bitwise operation on each group of aligned segments to thereby generate a plurality of partial results, and
combining all partial results to effectuate the execution of the logical bitwise operation.

12. The method of claim 11, further comprising:
storing a result of the execution of the logical bitwise operation within the memory module; and
providing the result from the memory module to the host.

13. The method of claim 11, wherein the logical bitwise operation is one of the following:
an OR operation;
an AND operation;
a NOT operation;
a NAND operation;
a NOR operation; and
an XOR operation.

14. The method of claim 11, wherein each bit vector-specific segment includes 8 bits.

15. The method of claim 11, further comprising performing the following prior to dividing each bit vector into the plurality of bit vector-specific segments:
receiving from the host physical addresses of memory locations in the memory module where respective bit vectors are stored; and
retrieving the bit vectors from the corresponding memory locations.

16. The method of claim 15, further comprising:
storing each received physical address in a pre-defined storage location within the memory module;
accessing the pre-defined storage location to obtain each received physical address for retrieving the respective bit vector; and
storing in the pre-defined storage location a final outcome of combining all partial results for future submission to the host.

17. The method of claim 11, wherein the memory module is one of the following:
a Three Dimensional Stack (3DS) memory module;
a High Bandwidth Memory (HBM) module;
a Hybrid Memory Cube (HMC) memory module;
a Solid State Drive (SSD);
a Dynamic Random Access Memory (DRAM) module;
a Static Random Access Memory (SRAM);
a Phase-Change Random Access Memory (PRAM);
a Resistive Random Access Memory (ReRAM);
a Conductive-Bridging RAM (CBRAM);
a Magnetic RAM (MRAM); and
a Spin-Transfer Torque MRAM (STT-MRAM).

18. A memory module, comprising:
a memory chip; and
a logic die connected to the memory chip and operative to control data transfer between the memory chip and an external host,
wherein the logic die includes a controller that is operative to:
receive an instruction from the host to perform at least one of the following:
a POPCOUNT operation on a first bit vector stored in the memory chip, and
a logical bitwise operation on two or more second bit vectors stored in the memory chip; and
perform at least one of the following:
execute the POPCOUNT operation, without transferring the first bit vector to the host for the execution of the POPCOUNT operation, and
execute the logical bitwise operation, without transferring the second bit vectors to the host for the execution of the logical bitwise operation,
wherein the controller includes a processing logic that comprises a plurality of adders, wherein the processing logic is operative to perform the following as part of executing the POPCOUNT operation:
retrieve the first bit vector from the memory chip;
divide bits in the first bit vector into a plurality of non-overlapping segments;
calculate a segment-specific bitcount for each of the plurality of non-overlapping segments;
use each segment-specific bitcount as an input to a corresponding one of the plurality of adders;
accumulate outputs from all adders in the plurality of adders in a register;
add all accumulated outputs to generate a first result of the execution of the POPCOUNT operation; and
store the first result in the register.

19. The memory module of claim 18, wherein the memory module is one of the following:
a Three Dimensional Stack (3DS) memory module;
a High Bandwidth Memory (HBM) module;
a Hybrid Memory Cube (HMC) memory module;
a Solid State Drive (SSD);
a Dynamic Random Access Memory (DRAM) module;
a Static Random Access Memory (SRAM);
a Phase-Change Random Access Memory (PRAM);
a Resistive Random Access Memory (ReRAM);
a Conductive-Bridging RAM (CBRAM);
a Magnetic RAM (MRAM); and
a Spin-Transfer Torque MRAM (STT-MRAM).

20. The memory module of claim 18, wherein the logic die further includes:
the register that is coupled to the controller, wherein the register is operative by the controller to store at least one of the following:

the first result of the execution of the POPCOUNT operation; and a second result of the execution of the logical bitwise operation, and wherein the controller is operative to further perform at least one of the following:

send the first result to a first storage location within the memory module for retrieval by the host, and send the second result to a second storage location within the memory module for retrieval by the host.

21. The memory module of claim 18, wherein the logical bitwise operation is one of the following:

an OR operation;
an AND operation;
a NOT operation;
a NAND operation;
a NOR operation; and
an XOR operation.

22. The memory module of claim 18, wherein the controller is operative to perform the following as part of executing the logical bitwise operation:

receive from the host physical addresses of memory locations in the memory chip where respective second bit vectors are stored;

retrieve the second bit vectors from the corresponding memory locations;

divide each second bit vector into a plurality of bit vector-specific non-overlapping segments;

align corresponding bit vector-specific segments from all second bit vectors into a plurality of groups of aligned segments;

perform the logical bitwise operation on each group of aligned segments to thereby generate a plurality of partial results;

combine all partial results to effectuate the execution of the logical bitwise operation; and store a final outcome of combining all partial results in a pre-defined storage location within the memory module for future submission to the host.

23. The memory module of claim 22, wherein the controller is operative to perform the following as part of retrieving the second bit vectors:

store each received physical address in the pre-defined storage location; and access the pre-defined storage location to obtain each received physical address for retrieving the respective second bit vector.

24. A memory module, comprising:

a memory chip; and a logic die connected to the memory chip and operative to control data transfer between the memory chip and an external host, wherein the logic die includes a controller that is operative to:

receive an instruction from the host to perform at least one of the following:

a POPCOUNT operation on a first bit vector stored in the memory chip, and a logical bitwise operation on two or more second bit vectors stored in the memory chip; and perform at least one of the following:

execute the POPCOUNT operation, without transferring the first bit vector to the host for the execution of the POPCOUNT operation, and execute the logical bitwise operation, without transferring the second bit vectors to the host for the execution of the logical bitwise operation, wherein the controller is operative to perform the following as part of executing the POPCOUNT operation:

receive from the host a physical address of a memory location in the memory chip where a respective portion of the first bit vector is stored;

for each received physical address, retrieve the respective portion of the first bit vector from the memory location to perform a partial bitcount on the retrieved portion of the first bit vector;

combine results of all partial bitcounts; and store a combined result of all partial bitcounts in a pre-defined storage location within the memory module for submission to the host as a final outcome of the execution of the POPCOUNT operation.

* * * * *